March 8, 1960 J. A. C. HYDE 2,927,424
VARIABLE AREA NOZZLE
Filed April 4, 1958 3 Sheets-Sheet 1

INVENTOR
J. A. C. HYDE
BY: Maybee & Legris
ATTORNEYS

March 8, 1960  J. A. C. HYDE  2,927,424
VARIABLE AREA NOZZLE

Filed April 4, 1958  3 Sheets-Sheet 2

INVENTOR
J. A. C. HYDE
BY Maybee & Legris
ATTORNEYS

United States Patent Office 2,927,424
Patented Mar. 8, 1960

2,927,424

VARIABLE AREA NOZZLE

John Alan Courtney Hyde, Georgetown, Ontario, Canada, assignor to Orenda Engines Limited, Malton, Ontario, Canada, a corporation of Canada Application April 4, 1958, Serial No. 726,395

16 Claims. (Cl. 60—35.6)

This invention relates to variable area nozzles which are used in reaction propulsion units of aircraft.

It is known that to be able to make the most efficient use of a reaction propulsion unit of an aircraft it is necessary to be able to vary the area of the nozzle through which the propulsive gases are discharged.

Various types of variable area nozzles have been proposed and the commonest type includes an annularly arranged plurality of longitudinally extending flaps hinged at their one ends to curved standing structure to provide a duct which terminates at the other ends of the flaps in a nozzle opening. The flaps are pivoted about their hinges to vary the area of the nozzle opening. Since the flaps are pivoted to curved standing structure, it will be appreciated that the clearance between the longitudinal edges of the flaps varies as the flaps are pivoted to vary the nozzle opening. It is therefore necessary to provide overlapping, longitudinally extending surfaces on the flaps to prevent the escape of the propulsive gases between the longitudinal edges of the flaps. The overlapping surfaces are normally forced into contact with one another by the pressure of the propulsive gases and a considerable frictional resistance at the overlapping surfaces must be overcome before the flaps will move. In many cases the existence of this frictional resistance causes the position of the nozzle to lag behind the position taken up by the nozzle actuators.

It is an object of the present invention to provide a construction of variable area nozzle wherein the friction between the flaps of the nozzle is considerably reduced.

A further object of the invention is to provide a construction of variable area nozzle wherein all the flaps may be pivoted to the standing structure, alternate flaps being provided with actuating means and the intermediate flaps being constrained to follow the actuated flaps.

A further object of the invention is to provide a construction of variable area nozzle wherein the friction between the flaps of the nozzle is reduced while means are provided for sealing the adjacent longitudinal edges of the flaps to prevent, or reduce to a minimum, the escape of the propulsive gases between the flaps.

Figure 1:
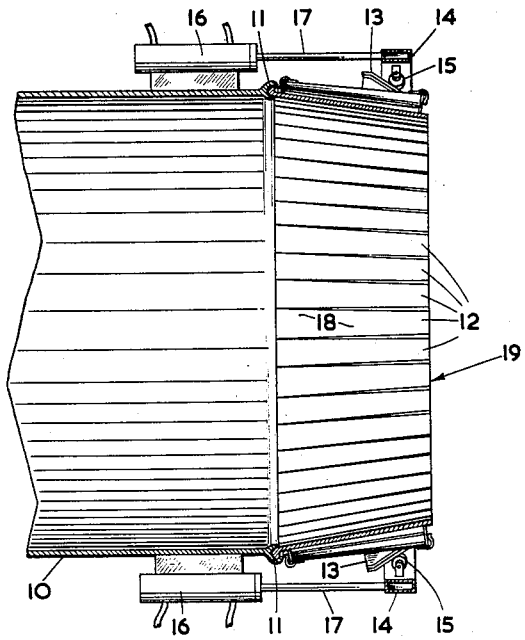
Figure 2:
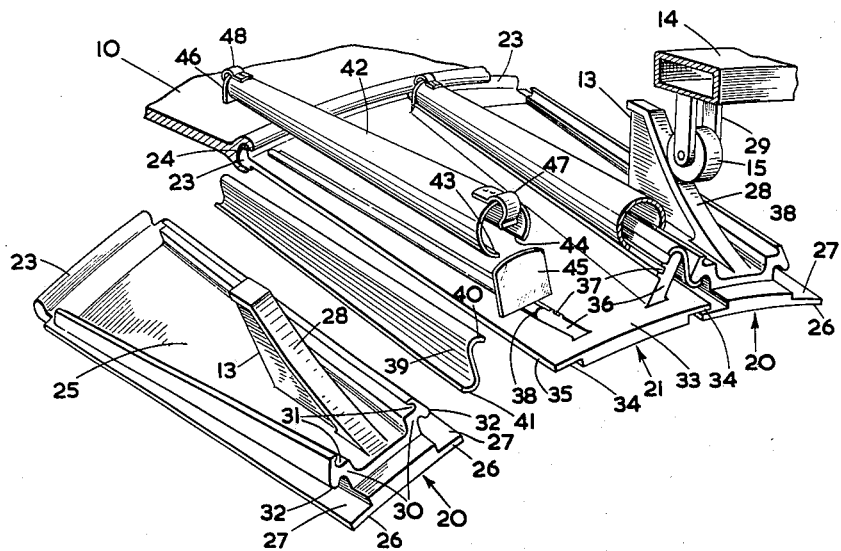
Figure 3:
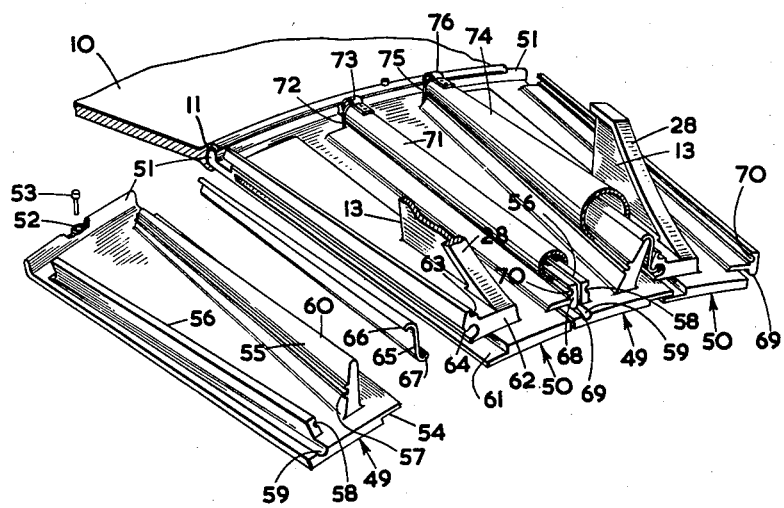
Figure 4:
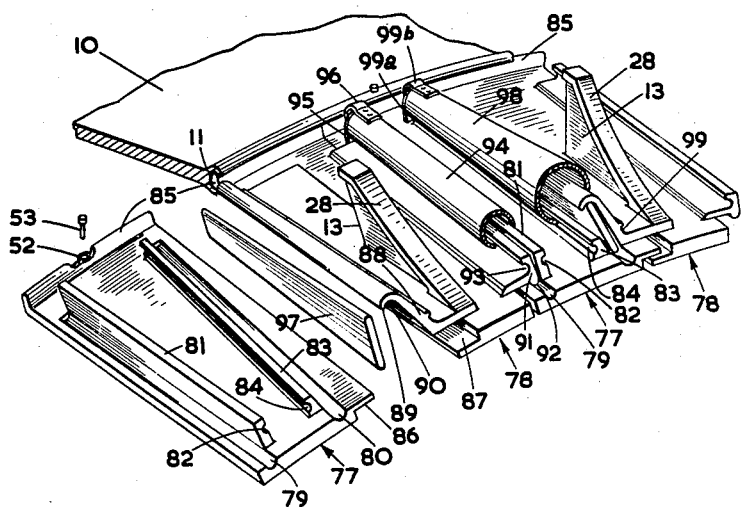
Figure 5:
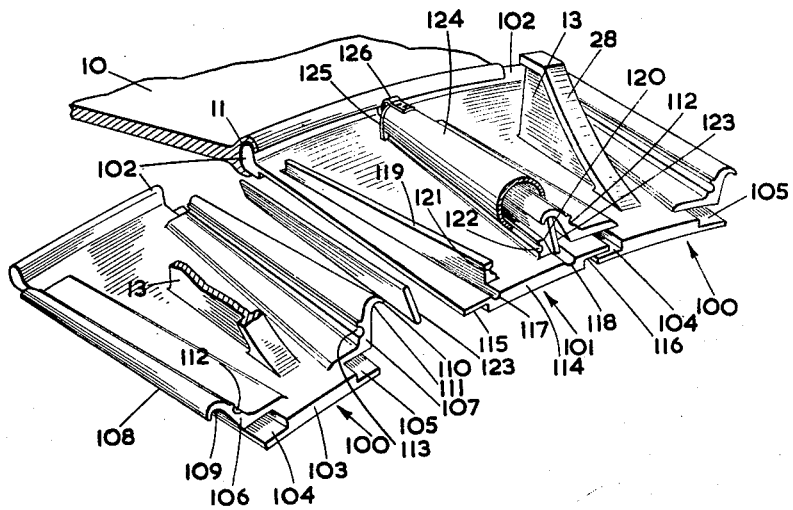

The invention will now be described by way of example with reference to the accompanying drawings, in which:

Figure 1 is a longitudinal section through a variable area nozzle according to the invention, Figure 2 is a scrap, "exploded," perspective view of the arrangement of adjacent flaps in one embodiment of the invention, Figure 3 is a view similar to Figure 2 showing the arrangement of adjacent flaps in a second embodiment of the invention, Figure 4 is a view similar to Figure 2 showing the arrangement of adjacent flaps in a third embodiment of the invention, and Figure 5 is a view similar to Figure 2 showing the arrangement of adjacent flaps in a fourth embodiment of the invention.

Referring now to Figure 1, the nozzle is mounted at the rear end of the jet pipe 10 of a gas turbine engine. The engine is not shown since it forms no part of the present invention but it may be of any convenient type. The rear edge of the jet pipe is provided with a circumferential groove 11 in which are pivotally mounted the flaps of the nozzle, the flaps being indicated at 12 in Figure 1. Each alternate flap is provided with a cam member 13 and the nozzle is surrounded by a unison ring 14 which carries a plurality of rollers 15, each roller cooperating with a cam member 13. The unison ring is moved axially by a plurality of hydraulic actuators, two of which are shown at 16 and the pistons (not shown) of the actuators are connected by rods 17 to the unison ring 14. It will be seen that as the actuators 16 pull the unison ring forwardly, i.e. to the left in Figure 1, the rollers 15 move along the cam surfaces of the cam members 13 and force the nozzle flaps inwardly, thus closing down the nozzle. Conversely, as the unison ring 14 is moved rearwardly, the gas pressure inside the nozzle tends to open the nozzle and therefore pivots the flaps outwardly until the cam members 13 contact the rollers 15. It will be seen that the flaps 12 provide a duct 18 which terminates at the free ends of the flaps in a nozzle opening 19.

Referring now to Figure 2, the mounting of the flaps of the nozzle will be described in more detail for one embodiment of the invention. The nozzle comprises two types of flap arranged alternately round the duct. Three adjacent flaps are shown in Figure 2, two of the flaps, indicated at 20, being of one type and the other flap, indicated at 21 being of the other type and located between the flaps 20. Each flap is provided at one end with a hinge portion 23 which is received within the circumferential groove 11. A wire braid 24 is also received within the groove 11 to provide a gas seal during pivoting of the flaps.

Referring now to the flaps 20, each of these includes a central and relatively thick portion 25 having rabbeted edges 26 providing longitudinal edge surfaces 27. Upstanding from the central portion 25 is a cam member 13 having a cam surface 28 which co-operates with one of the rollers 15 carried by trunnions 29 on the unison ring 14. Upstanding from the longitudinal edges of the flaps 20 are ribs 30 which are grooved at 31 and are provided with longitudinally extending radiused abutments 32.

Each flap 21 comprises a central relatively thick portion 33 having rabbeted edges 34 providing edge surfaces 35 facing in the opposite direction to the edge surfaces 27 on the flaps 20. Upstanding from the upper surface of the flap is a pair of inclined ribs 36 which are grooved at 37 and the upper edges of which provide longitudinally extending abutments 38. A swing link 39, having retroverted edges 40 and 41, is interposed between each pair of abutments 32 and 38 with the retroverted edge 40 in contact with the abutment 38 and the retroverted edge 41 in contact with the abutment 32.

Extending between each pair of adjacent ribs 30 and 36 is a resilient, elongated sealing member 42 having opposed longitudinal edges 43 and 44. The longitudinal edge 43 is received in the groove 31 and the longitudinal edge 44 is received in the groove 37. The ends of the sealing member 42 are closed by plates 45, 46 which are held in place by spring clips 47, 48 respectively.

Although only three flaps are shown in Figure 2, it will be appreciated that a nozzle is made up of a plurality of flaps 20, each pair of flaps 20 being separated by a flap 21.

The operation of the embodiment of the invention shown in Figure 2 is as follows: the gas pressure within the nozzle tends to force the nozzle flaps outwardly, the outward movement of the flaps 20 is controlled by the reaction between the rollers 15 and the cam surfaces 28 of the cam members 13. The flaps 21 tend to move outwardly until further movement is prevented by the engagement of the swing links 39 with the abutments 32 and 38. The swing links 39 are so dimensioned that the longitudinal edge surfaces 27 and 35 of the flaps will overlap as is shown to the right of Figure 2 but will be kept out of contact so that no frictional force must be overcome in moving the overlapping surfaces relatively to one another. However, the radial length of the links 39 is such that only a relatively small clearance is left between the surfaces 35 and 27 so that a constricted passage is formed between the overlapping surfaces tending to oppose the escape of the propulsive gases from the duct 18 between the longitudinal edges of the flaps.

The sealing members 42 with their end plates 45, 46, seal the gap between the ribs 30 and 36 and help to prevent the escape of gas which has managed to pass between the overlapping surfaces 27 and 35 and between the abutments 32 and 38 and the edges 40, 41 of the swing links 39. The section of each sealing member 42 is less at the ends of the flaps where they are hinged than at the other ends. This is because the relative circumferential movement of the longitudinal edges of the flaps is greater at the ends remote from the hinges than at the ends adjacent to the hinges, and to accommodate this varying extent of movement the section of the sealing member increases from one end to the other.

As the unison ring 14 is moved, the flaps will pivot in the groove 11 and the longitudinal edges of the flaps will move towards one another if the nozzle opening is reduced in area and will move away from one another if the nozzle opening is increased in area. It follows that the overlapping surfaces 27 and 35 will move circumferentially relatively to one another as the nozzle is opened or closed. During opening and closing of the nozzle, the swing links 39 will swing to accommodate the relative circumferential movement of the longitudinal edges of the flaps. Moreover, since the gas pressure in the duct 18 is always tending to push the flaps 21 outwardly, and since the swing links are correctly dimensioned, the overlapping surfaces 27 and 35 will be kept out of contact during opening and closing of the nozzle. It follows that, since the overlapping surfaces 35, 27 are held out of contact, the only frictional forces to be overcome in opening or closing the nozzle are those which are encountered at the hinge points of the flaps, the friction along the edges of the swing links, and the frictional force between the rollers 15 and the cam surfaces 28 of the cam members 13.

Although, when there is no fluid pressure within the duct 18, some of the flaps may tend to move inwardly so that the overlapping surfaces 35 and 27 come into contact; this is of little consequence since if there is no pressure in the nozzle the engine will not be in operation and if it is desired to close the nozzle for test purposes the force required will be small.

Referring now to Figure 3, in this embodiment of the invention also, the nozzle is made up of a plurality of flaps of two types arranged alternately round the duct. Four flaps are shown, two of one type, indicated at 49, and two of the other type, indicated at 50. Each flap 50 is interposed between a pair of flaps 49. Referring first to the flaps 49, these are provided with a hinge portion 51 which is a loose fit in the circumferential groove 11 in the jet pipe 10. Extending from the hinge portion is an apertured lug 52 through the aperture of which passes a pin 53. The ends of the pin are held in holes in the cheeks of the groove 11. The pin is a loose fit in the aperture and the flap is enabled to pivot about an axis generally radial of the duct in addition to pivoting about an axis generally tangential of the duct.

Each flap 49 has a rabbet along one longitudinal edge to provide a longitudinal edge surface 54. Upstanding from the upper surface of each flap is a rib 55 and a further rib 56. The rib 55 is provided with a groove 57 and the rib 56 is provided with a groove 58. A channel 59 is formed in the other longitudinal edge of the flap adjacent to the rib 56. The upper edge of the rib 55 provides a longitudinally extending abutment 60.

Referring now to the flaps 50, each of these has a rabbet along one edge which provides a longitudinal edge surface 61. Upstanding from the upper face of each flap is a rib 62 which extends to overhang the edge surface 61. The rib is grooved at 63 and is provided with a longitudinally extending abutment surface 64. A swing link 65 having retroverted edges 66, 67 extends between each pair of abutments 60 and 64. The length of each swing link is such that, when there is fluid pressure in the duct tending to force the nozzle open, the overlapping surfaces 54 and 61 are maintained out of contact. Each flap 50 has a further rib 68 which overhangs the edge of the flap and provides a ridge 69 to mate with the channel 59 of the adjacent flap. The rib 68 is also grooved at 70 and a C-section sealing member 71 has its opposed longitudinal edges engaged in the grooves 58 and 70. The ends of the sealing member are closed by a pair of plates, one of which is shown at 72; the plate 72 is held in position by a spring clip 73.

The flaps 50 carry cam members 13 with cam surfaces 28 in a similar manner to the flaps 20 of the first described embodiment. The circumferential gaps between the ribs 55 and 62 are closed by elongated sealing members 74 having their opposed longitudinal edges engaged in the grooves 57 and 63. The ends of each sealing member 74 are closed by plates, one of which is shown at 75, and which are held in position by spring clips 76. The cross-section of each sealing member 74 is less at the ends of the flaps at which they are pivoted than at the other ends of the flaps for the reason explained in relation to the sealing members 42.

The operation of the embodiment shown in Figure 3 is similar to the operation of the embodiment shown in Figure 2 except that the relative circumferential movement between the longitudinal edges of the flaps is allowed to occur along only one edge of each flap instead of along both longitudinal edges of each flap as in the embodiment shown in Figure 2. During opening and closing of the nozzle the flaps 49 pivot about the pins 53 so that each pair of flaps 49, 50 acts as a composite flap due to the hinged connection between them, and the overlapping surfaces 54 and 61 occur along the edges of each such composite flap. The overlapping surfaces 61 and 54 are kept out of contact by the swing links 65 in a manner similar to that described with reference to Figure 2. The rib 68 on each flap 50 overlaps the adjacent edge of the flap 49 and the hinge means consisting of the ridge 69 and the channel 59 maintain the adjacent edges of the flaps together during opening and closing of the nozzle.

Referring now to Figure 4, a further embodiment of the invention is shown wherein the nozzle is again made up of two different types of flaps which are arranged alternately around the nozzle. In this embodiment the one type of flap is indicated at 77 and the other type of flap at 78. Each of the flaps indicated at 77 is provided adjacent to one longitudinal edge with a channel 79 and adjacent to the other longitudinal edge with an abutment surface 80 which is formed by a longitudinal groove. The flap is also provided with a pair of upstanding ribs one which is indicated at 81 and has a longitudinal groove 82 whereas the other is indicated at 83 and has a longitudinal groove 84. Each flap 77 has a hinge portion indicated generally at 85. The hinge portion is similar to that shown at 51, 52, 53 for the flaps 49 and will not be described except to say that the flaps 77 are enabled to pivot about axes generally radial of the duct. The edge of each flap adjacent to the abutment surface 80 is rabbeted to provide a longitudinal edge surface 86.

Referring now to the flaps 78; each flap has one edge rabbeted to provide a longitudinal edge surface 87 and has two upstanding ribs one of which is indicated at 88.

The rib 88 has a retroverted edge 89, the under surface of which forms an abutment 90. Each flap 78 also has a cam member 13 with a cam surface 28, as in the other embodiments, and a further rib 91 which overlaps the other longitudinal edge of the flap and is provided with a ridge 92 which mates with the channel 79 in the edge of the adjacent flap 77. The rib 91 is provided with a groove 93 and a sealing member 94 of C-section is engaged in each pair of grooves 82 and 93. The ends of the sealing member 94 are closed by plates, one of which is shown at 95, the plates being kept in position by spring clips 96.

A swing link 97 is interposed between the abutment surface 90 on each flap 78 and the abutment surface 80 on an adjacent flap 77. A sealing member 98 of C-shaped cross-section is received in a groove 84 and in a groove 99, on the rib 88. The ends of the sealing member are closed by plates, one of which is shown at 99a, kept in position by spring clips 99b. The sealing members 98 have a varying cross-section for the reason explained with reference to the sealing members 42 in Figure 2.

The operation of the embodiment shown in Figure 4 is in many respects identical to the operation of the embodiment of the invention shown in Figure 3. The major difference is that the swing links 97 are held in compression whereas the swing links 65 of the embodiment shown in Figure 3 are held in tension. Thus, in a given position of the nozzle, the flaps 78 are maintained in the given position by the reaction of the rollers 15 on the cam surfaces 28 and by the fluid pressure in the duct 18 tending to force the nozzle open. The flaps 77 are maintained in position by the reaction of the swing links 97 on the abutments 80 and 90, and by the reaction between the ridges 92 and the channels 79. The gaps between the longitudinal edges of the flaps as the nozzle opens and closes are sealed by the overlapping surfaces 86, 87 which are maintained out of contact by the swing links 97. As in the embodiment of Figure 3, each pair of flaps acts as a composite flap, the flaps 77 pivoting about a radial axis as well as about a tangential axis. As the nozzle is opened and closed the swing links swing to accommodate the relative circumferential movement of the overlapping surfaces 86 and 87 but maintain the surfaces out of contact. The sealing members 94 and 98 perform the same functions as the sealing members in the embodiments previously described.

Referring now to Figure 5, the further embodiment of the invention there shown is somewhat similar to the embodiment shown in Figure 2, the main difference being that swing links are used which are held in compression rather than in tension as in the arrangement shown in Figure 2.

The nozzle of Figure 5 is composed of a plurality of elements of two types which are indicated at 100 and 101, the flaps being arranged alternately round the nozzle. Each flap 100 comprises a hinge portion 102 which is received in the circumferential groove 11 of the jet pipe 10 and a central portion 103 having rabbeted edges providing longitudinally extending surfaces 104, 105. Upstanding from the upper surface of each flap is a pair of ribs 106, 107 which overhang the longitudinal edge surfaces 104, 105 respectively. The rib 106 has a retroverted edge portion 108, the inner surface of which provides a longitudinally extending abutment 109. Similarly, the rib 107 has a retroverted edge portion 110, the inner surface of which provides a longitudinally extending abutment 111. The rib 106 is also provided with a groove 112 while the rib 107 is provided with a groove 113. The flaps 100 are provided with cam members 13 having cam surfaces 28.

Each of the flaps 101 comprises a central portion 114 with rabbeted edges which provide longitudinally extending edge surfaces 115 and 116 which overlap the longitudinally extending edge surfaces 111 and 112 of the flaps 100. Each of the flaps 101 is also provided with a pair of abutments 117 and 118 in the form of longitudinal grooves. A pair of ribs 119, 120 upstand from the upper surface of each flap 101 and are provided with grooves 121 and 122 respectively. Swing links 123 are interposed between each pair of flaps and mate with the facing abutment surfaces 111, 117 respectively and 109 and 118. A sealing member 124 is received in each pair of adjacent grooves 113 and 121 and in each pair of adjacent grooves 112 and 122. The ends of the sealing members are closed by plates 125, kept in place by spring clips 126.

The operation of this embodiment of the invention is the same as that of the embodiment shown in Figure 2 except that when the flaps 101 are forced outwardly by the gas pressure in the duct the swing links 123 are placed in compression whereas the swing links 39 in the embodiment shown in Figure 2 are placed in tension when the flaps are forced outwardly. The swing links 123 are so dimensioned that when the gas pressure forces the flaps 101 outwardly the swing links are in contact with their respective abutments and the overlapping surfaces 105, 115, and 104, 118 respectively are kept out of contact but are sufficiently close together to form constricted passages to oppose the escape of gas between the longitudinal edges of the flaps. The sealing members 124 prevent the escape of any gas which has managed to get between the overlapping surfaces and between the swing links and their abutments.

The sealing members 124 are generally cone shaped, the cross-section of the sealing member at the end of the flaps adjacent to the hinge points being less than the cross-section of the sealing member at the other ends of the flaps, i.e. at the nozzle opening. The reason for this, as mentioned above, is that the circumferential relative movement of the overlapping surfaces of the flaps is greater at the ends of the flaps remote from the hinges than at the ends adjacent to the hinges and this varying extent of movement is accommodated by making the sealing members in cone form.

It will be seen that the invention provides a form of nozzle construction in which the friction between adjacent nozzle flaps is reduced compared with conventional designs. This reduction in friction permits the use of less powerful actuators than is usual while virtually eliminating any lag between the position of the actuators and the position of the nozzle. Moreover, it will be seen that the invention provides a construction in which only alternate segments are actuated and in which efficient gas seals are provided between adjacent flaps.

It will be understood that the form of the invention herewith shown and described is a preferred example and various modifications can be carried out without departing from the spirit of the invention or the scope of the appended claims.

What I claim as my invention is:

1. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on two adjacent flaps, a first abutment extending longitudinally along one of the two flaps, a second abutment extending longitudinally along the other of the two flaps, the abutments being spaced apart in a generally radial direction relatively to the duct, and a longitudinally extending swing link radially interposed between the abutments and engaging them to form an articulation between the two flaps, the link, when there is fluid pressure in the duct tending to increase the area of the nozzle opening, locating the flaps relatively to one another with the overlappig surfaces spaced apart but providing a constriction opposing flow of fluid from the duct between the overlapping surfaces.

2. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on two adjacent flaps, a first abutment extending longitudinally along one of the flaps, a second abutment extending longitudinally along the other of the two flaps, the abutments facing one another and being spaced apart in a generally radial direction relatively to the duct, and a longitudinally extending swing link radially interposed between the abutments and engaging them to form an articulation between the two flaps, the link, when there is fluid pressure in the duct tending to increase the area of the nozzle opening, being in compression between the abutments and locating the flaps relatively to one another with the overlapping surfaces spaced apart but providing a constriction opposing flow of fluid from the duct between the overlapping surfaces.

3. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on two adjacent flaps, a first abutment extending longitudinally along one of the two flaps, a second abutment extending longitudinally along the other of the two flaps, the abutments being spaced apart in a generally radial direction relatively to the duct and facing in opposite directions, and a longitudinally extending swing link having retroverted edges radially interposed between the abutments, the retroverted edges of the swing link engaging the abutments so that the link forms an articulation between the two flaps, the link, when there is fluid pressure in the duct tending to increase the area of the nozzle opening, being in tension and locating the flaps relatively to one another with the overlapping surfaces spaced apart but providing a constriction opposing flow of fluid from the duct between the overlapping surfaces.

4. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on adjacent flaps, abutments extending longitudinally along both longitudinal edges of each flap, the abutments on adjacent edges of adjacent flaps being spaced apart in a generally radial direction relatively to the duct, and longitudinally extending swing links radially interposed between each pair of radially spaced abutments and engaging them to form articulations between adjacent flaps, the links, when there is fluid pressure in the duct tending to increase the area of the nozzle opening, locating the flaps relatively to one another with the overlapping surfaces spaced apart but providing constrictions opposing flow of fluid from the duct between the overlapping surfaces.

5. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on adjacent flaps, abutments extending longitudinally along both longitudinal edges if each flap, the abutments on adjacent edges of adjacent flaps forming a pair facing each other and spaced apart in a generally radial direction relatively to the duct, and longitudinally extending swing links radially interposed between the pairs of abutments and engaging them to form articulations between the flaps, the links, when there is fluid pressure in the duct tending to increase the area of the nozzle opening, being in compression and locating the flaps relatively to one another with the overlapping surfaces spaced apart but providing constrictions opposing flow of fluid from the duct between the overlapping surfaces.

6. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on adjacent flaps, abutments extending longitudinally along both longitudinal edges of each flap, the abutments along adjacent edges of adjacent flaps forming a pair and facing in opposite directions and being spaced apart in a generally radial direction relatively to the duct, and a plurality of longitudinally extending swing links having retroverted edges, a swing link being radially interposed between each pair of abutments with the retroverted edges of the links engaging the abutments to form articulations between the flaps, the links, when there is fluid pressure in the duct tending to increase the area of the nozzle opening, locating the flaps relatively to one another with the overlapping surfaces spaced apart but providing constrictions opposing flow of fluid from the duct between the overlapping surfaces.

7. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, pivotal mounting means hinging each alternate flap for movement about two axes one generally radial of the duct and the other generally tangential to the duct, means hingedly connecting one longitudinal edge of each flap to the adjacent longitudinal edge of an adjacent flap, the other longitudinal edge of each flap being provided with an abutment, the abutments on adjacent longitudinal edges of adjacent flaps forming a pair and being spaced apart in a generally radial direction relatively to the duct, overlapping surfaces on those edges of the flaps provided with the abutments, and longitudinally extending swing links radially interposed between each pair of abutments and engaging them to form articulations between the flaps, the links, when there is fluid pressure in the ducts tending to increase the area of the nozzle opening, locating the flaps relatively to one another with the overlapping surfaces spaced apart but providing constrictions opposing flow of fluid from the duct between the overlapping surfaces.

8. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, pivotal mounting means hinging each alternate flap for movement about two axes one generally radial of the duct and the other generally tangential to the duct, means hingedly connecting one longitudinal edge of each flap with an adjacent longitudinal edge of an adjacent flap, abutments extending longitudinally along the other edges of the flaps, the abutments on adjacent edges of adjacent flaps forming a pair and being spaced apart in a generally radial direction relatively to the duct, the abutments of each pair facing one another, and longitudinally extending swing links radially interposed between each pair of abutments and engaging them to form articulations between the flaps, the links, when there is fluid pressure in the duct tending to increase the area of the nozzle opening, locating the flaps relatively to one another with the overlapping surfaces spaced apart but providing constrictions opposing flow of fluid from the duct between the overlapping surfaces.

9. A nozzle according to claim 8 wherein the means hingedly connecting longitudinal edges of the flaps include a ridge provided along one longitudinal edge of some of the flaps and channels formed along one longitudinal edge of the others of the flaps, the ridges being received within the channels.

10. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, pivotal mounting means hinging each alternate flap for movement about two axes one generally radial of the duct and the other generally tangential to the duct, means hingedly connecting one edge of each of the flaps with an adjacent edge of an adjacent flap, abutments extending along the other edges of the flaps, the abutments on adjacent edges of adjacent flaps forming a pair, the abutments of the pair being spaced apart in a generally radial direction relatively to the duct and facing in opposite directions, overlapping surfaces on each pair of adjacent flaps along the edges provided with the abutments, and longitudinally extending swing links radially interposed between the abutments of each pair, the swing links having retroverted edges which engage the abutments so that the links form articulations between the flaps, the links, when there is fluid pressure in the duct tending to increase the area of the nozzle opening, locating the flaps relatively to one another with the overlapping surfaces spaced apart but providing constrictions opposing flow of fluid from the duct between the overlapping surfaces.

11. A nozzle according to claim 10 wherein the means hingedly connecting longitudinal edges of the flaps include a ridge provided along one longitudinal edge of some of the flaps and channels formed along one longitudinal edge of others of the flaps, the ridges being received within the channels.

12. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on two adjacent flaps, a first abutment extending longitudinally along one of the two flaps, a second abutment extending longitudinally along the other of the two flaps, the abutments being spaced apart in a generally radial direction relatively to the duct, a longitudinally extending swing link radially interposed between the abutments and engaging them to form an articulation between the two flaps, the link, when there is fluid pressure in the duct tending to increase the area of the nozzle opening, locating the flaps relatively to one another with the overlapping surfaces spaced apart but providing a constriction opposing flow of the fluid from the duct between the overlapping surfaces, a first longitudinally extending rib on one of the two flaps, a second longitudinally extending rib on the other of the two flaps, the ribs being adjacent to the overlapping surfaces, a groove in each of the ribs, the grooves being oppositely directed, and a resilient, elongated sealing member of C-section having opposed longitudinal edges, the opposed longitudinal edges of the sealing member being received in the oppositely directed grooves in the ribs.

13. A nozzle according to claim 12 wherein the elongated sealing member has a smaller cross-section at its end adjacent to the one end of the flaps than at its end adjacent to the other ends of the flaps.

14. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, overlapping surfaces on adjacent flaps, abutments extending longitudinally along both longitudinal edges of each flap, the abutments on adjacent edges of adjacent flaps being spaced apart in a generally radial direction relatively to the duct, longitudinally extending swing links radially interposed between each pair of radially spaced abutments and engaging them to form articulations between adjacent flaps, the links, when there is fluid pressure in the duct tending to increase the area of the nozzle opening, locating the flaps relatively to one another with the overlapping surfaces spaced apart but providing constrictions opposing flow of fluid from the duct between the overlapping surfaces, ribs extending longitudinally along both longitudinal edges of each flap, a groove in each of said ribs, the grooves in adjacent ribs on adjacent flaps being oppositely directed and forming a pair, and a plurality of elongated, resilient sealing members of C-section having opposed edges, one of said sealing members being associated with each pair of grooves, the opposed edges of the sealing member being received in the grooves of the pair.

15. A nozzle according to claim 14 wherein the sealing member has a less cross section at the one ends of the flaps than at the other ends of the flaps adjacent to the nozzle opening.

16. A nozzle including a plurality of annularly arranged longitudinally extending flaps pivoted at their one ends to curved standing structure to provide a duct terminating at the other ends of the flaps in a nozzle opening, means to pivot the flaps to vary the area of the nozzle opening, pivotal mounting means hinging each alternate flap for movement about two axes one generally radial of the duct and the other generally tangential to the duct, means hingedly connecting one longitudinal edge of each flap to the adjacent longitudinal edge of the adjacent flap, the other longitudinal edge of each flap being provided with an abutment, the abutments along the adjacent longitudinal edges of adjacent flaps forming a pair and being spaced apart in a generally radial direction relatively to the duct, overlapping surfaces on those edges of the flaps provided with abutments, longitudinally extending swing links radially interposed between each pair of abutments and engaging them to form articulations between the flaps, the links, when there is fluid pressure in the duct tending to increase the area of the nozzle opening, locating the flaps relatively to one another with the overlapping surfaces spaced apart but providing constrictions opposing the flow of fluid from the duct between the overlapping surfaces, longitudinally extending ribs adjacent to the longitudinal edges of each flap, a groove in each longitudinally extending rib, the grooves in adjacent ribs of adjacent flaps being oppositely directed, and a plurality of resilient elongated sealing members of C-section having opposed longitudinal edges, a sealing member being associated with each adjacent pair of grooves with the opposed edges of the sealing member being received in the grooves.

References Cited in the file of this patent

UNITED STATES PATENTS

| | | |
|---|---|---|
| 2,065,612 | Rasmussen | Dec. 29, 1936 |
| 2,693,078 | Laucher | Nov. 2, 1954 |